United States Patent
Sumser et al.

(10) Patent No.: US 6,813,887 B2
(45) Date of Patent: Nov. 9, 2004

(54) EXHAUST-GAS TURBOCHARGER FOR AN INTERNAL COMBUSTION ENGINE, AND METHOD FOR OPERATING A TURBOCHARGED INTERNAL COMBUSTION ENGINE

(75) Inventors: Siegfried Sumser, Stuttgart (DE); Aloysius Schunk, Fellbach (DE); Peter Fledersbacher, Stuttgart (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/304,094

(22) Filed: Nov. 26, 2002

(65) Prior Publication Data

US 2003/0131596 A1 Jul. 17, 2003

(30) Foreign Application Priority Data

Nov. 30, 2001 (DE) .......................... 101 58 874

(51) Int. Cl.[7] .......................... F02B 33/44; F02B 37/00
(52) U.S. Cl. .................. 60/611; 60/606; 60/607; 60/608; 123/559.1
(58) Field of Search ................ 60/609, 611, 612, 60/659, 605.1, 606, 607, 608; 123/559.1

(56) References Cited

U.S. PATENT DOCUMENTS

| 3,462,071 A | 8/1969 | Garve ................... 123/559.1 |
| 3,921,403 A | 11/1975 | McInerney et al. ....... 123/559.1 |
| 4,689,960 A | * 9/1987 | Schroder et al. .............. 60/611 |
| 4,696,165 A | * 9/1987 | Bucher ........................ 60/611 |
| 5,461,860 A | * 10/1995 | Schegk ........................ 60/611 |
| 5,937,833 A | * 8/1999 | Kapich ........................ 60/609 |
| 6,182,449 B1 | 2/2001 | Halimi et al. ................. 60/608 |
| 6,634,174 B2 | * 10/2003 | Sumser et al. ............... 60/611 |

FOREIGN PATENT DOCUMENTS

| DE | 2808147 A1 | 8/1979 |
| DE | 19823274 C1 | 10/1999 |

OTHER PUBLICATIONS

European Search Report dated Oct. 10, 2003.

* cited by examiner

Primary Examiner—Sheldon J Richter
(74) Attorney, Agent, or Firm—Crowell & Moring LLP

(57) ABSTRACT

An exhaust-gas turbocharger for an internal combustion engine includes an exhaust-gas turbine in the exhaust section and a compressor in the intake tract. The compressor includes a compressor impeller in an inflow passage in the compressor housing. Furthermore, there is an auxiliary-air feed device, which is assigned to the compressor region and has an auxiliary-air passage, in the compressor housing for supplying auxiliary air, which can be introduced via an injection opening in the wall of the inflow passage of the compressor into the flow-facing region of the compressor impeller.

20 Claims, 4 Drawing Sheets

EXHAUST-GAS TURBOCHARGER FOR AN INTERNAL COMBUSTION ENGINE, AND METHOD FOR OPERATING A TURBOCHARGED INTERNAL COMBUSTION ENGINE

This application claims the priority of German application 101 58 874.7, filed Nov. 30, 2001, the disclosure of which is expressly incorporated by reference herein.

The present invention relates to an exhaust-gas turbocharger for an internal combustion engine including an exhaust-gas turbine in an exhaust section and a compressor in an intake tract. The compressor includes a compressor impeller in an inflow passage in a compressor housing, and an auxiliary-air feed device for feeding in auxiliary air is assigned to a compressor region. The invention also relates to a method for operating a turbocharged internal combustion engine.

German document DE-A 28 08 147 describes an exhaust-gas turbocharger having an exhaust-gas turbine which is acted on by the engine exhaust gases, and a compressor impeller, which is driven by the exhaust-gas turbine and compresses intake combustion air to an increased charging pressure at which the combustion air is fed to the cylinder inlets of the internal combustion engine. An electric motor is integrated in the exhaust-gas turbocharger and its armature is seated on the charger shaft between turbine wheel and compressor impeller, so that when the electric motor is actuated, the charger shaft is additionally driven. As a result, the compressor provides additional compressor work in order to generate a higher charging pressure in particular in internal combustion engine operating states in which little exhaust gas is discharged. As a result, a high charging pressure can be generated even in internal combustion engine operating states in which the exhaust-gas energy is as yet insufficient to accelerate the turbocharger to a suitable rotational speed.

However, the provision of an electric motor entails additional outlay on design, parts and assembly. A further drawback is that the armature of the electric motor, which engages around the charger shaft, constitutes additional weight which also has to be accelerated by the exhaust-gas turbocharger when the electric motor is switched off, which has an adverse effect on the efficiency of the charger.

Although relatively high charging pressures can be reached even in the low load range with auxiliary measures, such as for example the electric motor described above, the compressor working range is limited by what is known as the surge limit in the compressor characteristic diagram, which describes the working range of the compressor by means of the pressure ratio of output pressure to input pressure at the compressor as a function of the air mass throughput through the compressor. The surge limit in this context represents a limiting characteristic curve which limits the output of the compressor in the range of low mass throughputs combined, at the same time, with a high output pressure; this corresponds to an internal combustion engine operating state with a high load and a low rotational speed. With operation close to the surge limit, locally limited zones where the flow becomes detached are formed, resulting in periodic pulsation in the flow with a change in the direction of flow and associated noise. To increase the operating range of the compressor, in particular in high-load and low-speed ranges, therefore, it is aimed to shift the surge limit towards lower mass throughputs.

To shift the surge limit, it is possible to provide characteristic-diagram stabilization measures, which comprise, for example, a bypass in the compressor housing which bridges a section of the inflow passage in the compressor in the region of the compressor-impeller inlet edge. A measure of this type is described in German publication DE 198 23 274 C1. If the compressor is operated close to the surge limit, the bypass allows targeted recirculation of a partial mass stream in the opposite direction to the delivery direction. The returned partial mass stream enters the inflow passage again in the inlet region of the compressor and is sucked in again together with the main stream.

Proceeding from this prior art, the invention is based on the problem of increasing the power of an internal combustion engine by means of structurally simple measures relating to the exhaust-gas turbocharger. It is intended in particular to increase the working range of an exhaust-gas turbocharger by means of simple measures.

According to the invention, this problem is solved by having the auxiliary-air feed device include an auxiliary-air passage in the compressor housing for supplying auxiliary air which can be introduced, via an injection opening in a wall of the inflow passage of the compressor, into a flow-facing region of the compressor impeller. The problem is also solved by way of a method for operating an internal combustion engine including feeding auxiliary air into the flow-facing region of the compressor impeller in the inflow passage during acceleration phases of the engine. Expedient refinements are reflected in dependent claims.

The exhaust-gas turbocharger has a device for feeding in auxiliary air, which comprises an auxiliary-air passage in the compressor housing, via which auxiliary air can be introduced via an injection opening in the wall of the inflow passage into the flow-facing region of the compressor impeller. The auxiliary air which is blown into the flow-facing region of the compressor impeller influences the surge limit in favour of lower mass throughputs combined, at the same time, with a high compressor pressure ratio as a result of the air which is additionally blown in coming into contact with flow boundary layers at the outer contour of the compressor impeller with a flow momentum which moves the boundary layers onwards in the intended direction of flow, with the result that a reversal in the velocity direction of the flow which is typical of the pumping characteristics is avoided and there is a shift in favour of a wider working range. Furthermore, the injection offers the additional advantage that the compressor impeller is additionally driven by the air which is blown in, resulting in a more rapid increase in the turbocharger rotational speed than would be the case without this injection or other external aid. The higher charging pressure on the one hand helps to avoid the undesirable turbolag at a low load/speed of the internal combustion engine and provides a rapid, smooth increase during the acceleration phase. On the other hand, the additional injection of air allows the power to be increased even in the upper load and speed ranges of the internal combustion engine.

The injection opening for feeding the auxiliary air into the inflow passage is located in a region upstream of the compressor-impeller flow-facing side through to slightly downstream of the flow-facing end face of the compressor impeller, but still upstream of those sections of the compressor impeller in which compression of the combustion air is already taking place.

In an expedient refinement, there is an annular space which is connected to the auxiliary-air passage, radially surrounds the inflow passage and is in communication with the inflow passage via the injection opening. The annular space serves as a collection space for the auxiliary air which has been introduced into the compressor housing, from which the air is passed into the inflow passage via the injection opening or the injection openings. The annular space has the effect of compensating for pressure surges, so that it is ensured that the auxiliary air is fed in at a constant pressure.

It is advantageous for a plurality of injection openings to be distributed over the periphery of the inflow passage, so that a uniform supply of air to the compressor impeller is ensured. As an alternative to a plurality of individual injection openings, it may also be expedient for the injection opening to be designed as an annular slot in the wall of the inflow passage, via which the auxiliary-air passage or the annular space is connected to the inflow passage.

In the injection opening, there may be a swirl grating, which imparts a swirl to the auxiliary air flowing in, advantageously an additional swirl in the direction of rotation of the impeller, in order to optimally reinforce the driving of the compressor impeller. The swirl grating may if appropriate be designed as an adjustable guide grating, by means of which the free inlet cross section of flow to the inflow passage can be variably adjusted, for example by means of displaceable guide vanes.

In addition or as an alternative to the swirl grating, the injection opening may also be designed as an annular nozzle, or an annular nozzle of this type may be integrated in the injection opening. In this inexpensive design too, it is possible to generate a supplementary swirling flow in the auxiliary air which is blown in, in particular if the annular space has a cross section which narrows in the circumferential direction.

By contrast, if there is a swirl grating in the injection opening, the annular space expediently has a cross section which remains constant in the circumferential direction. If appropriate, however, a narrowing cross section of the annual space is possible in combination with the swirl grating.

The exhaust-gas turbocharger is expediently equipped with a recirculation device which performs the function of a measure for stabilizing the characteristic diagram. The recirculation device comprises a bypass to the inflow passage, which in particular bridges the injection opening for the auxiliary-air feed and has a recirculation opening downstream of the injection opening and a return opening upstream of the injection opening. Via the recirculation device, a partial mass flow of the combustion air which is supplied is returned in the opposite direction to the main direction of flow and introduced back into the inflow passage via the return opening.

The auxiliary-air passage is advantageously connected to an auxiliary-air store, which for its part may be supplied with air by a compressor, which is expediently driven by the internal combustion engine. The auxiliary-air store may be responsible for further functions in addition to that of feeding auxiliary air into the flow-facing region of the compressor impeller, in particular may be responsible for additionally feeding combustion air into the intake tract downstream of the compressor at the start of an acceleration phase of the internal combustion engine, in order, in this operating range, to provide further combustion air at elevated pressure in addition to the charge air supplied by the compressor.

In the method according to the invention, in acceleration phases of the engine, auxiliary air is fed into the flow-facing region of the compressor impeller in the compressor inflow passage, the air expediently being fed in in situations in which the rotational speed of the exhaust-gas turbocharger reaches or exceeds a threshold value, above which there is an acute danger to the pump in the compressor on account of the rapidly increased turbine power. The risk to the pump is eliminated or reduced by blowing in the auxiliary air and, moreover, this air additionally drives the compressor impeller. Below the charger rotational speed threshold value, it may be expedient for auxiliary air to be fed directly into the intake tract downstream of the compressor, in order in this way to provide an increased charging pressure.

The feed of air directly into the intake tract downstream of the compressor is expediently interrupted if the charging pressure in the intake tract reaches a set value. At the same time or as an alternative, the feed of air into the inflow passage of the compressor can be reduced to a level which allows a desired charging-air set value.

To relieve the load on the auxiliary-air store, compressed air from the intake tract downstream of the compressor can be returned into the flow-facing region of the compressor impeller in the inflow passage, resulting in the availability of auxiliary air in the auxiliary-air store becoming at least partially independent.

Further advantages and expedient embodiments are given in the further claims, the description of the figures and the drawings.

DESCRIPTION OF THE PREFERRED EMBODIMENTS

In the following figures, identical components are provided with identical reference symbols.

Figure 1:
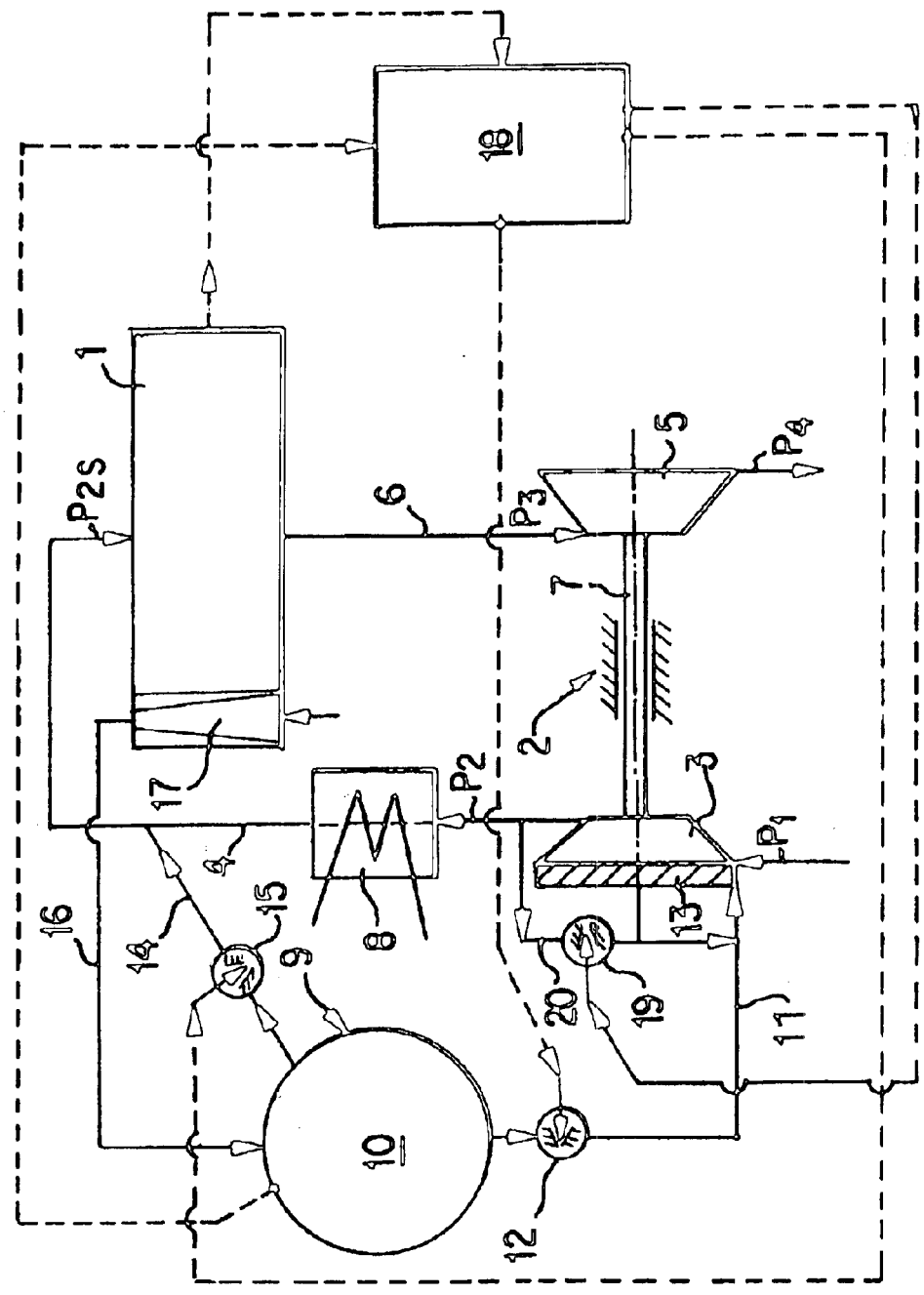
FIG. 1 diagrammatically depicts a turbocharged internal combustion engine, the compressor of the exhaust-gas turbocharger being connected to an auxiliary-air feed device.

The internal combustion engine 1 illustrated in FIG. 1—a spark-ignition engine or a diesel engine—is assigned an exhaust-gas turbocharger 2 with a compressor 3 in the intake tract 4 and an exhaust-gas turbine 5 in the exhaust section 6. The exhaust-gas turbine 5 is driven by the exhaust gases from the internal combustion engine 1 and the rotary movement of the turbine wheel is transmitted via a charger shaft 7 to a compressor impeller in the compressor 3. The compressor then sucks in ambient pressure at the ambient pressure $p_1$ and compresses the air to an elevated temperature, at which the air is firstly cooled in a charge-air cooler 8 and then fed at the charging pressure $p_{25}$ to the cylinder inlets of the internal combustion engine 1. On the exhaust side, the exhaust gases leave the internal combustion engine 1 at the exhaust-gas back-pressure $p_3$, at which the exhaust gases are fed to the exhaust-gas turbine 5. After they have left the exhaust-gas turbine 5, the exhaust gases adopt the expanded pressure $p_4$ and then, after subsequent purification, are blown off to atmosphere. The exhaust-gas turbocharger 2 or the internal combustion engine 1 is assigned a device 9 for feeding in auxiliary air, which comprises an auxiliary-air store 10 holding compressed air, which is connected to the inflow passage of the compressor 3 via a connecting line 11 in which there is an adjustable valve 12. In the opening position of the valve 12, auxiliary air which is at an elevated pressure is blown out of the auxiliary-air store 10 into the inflow passage of the compressor in addition to the ambient air which is sucked in by the compressor. As illustrated in detail in FIGS. 2 and 3, the injection point is located in the flow-facing region of the compressor impeller. There is expediently a swirl grating 13 in the injection opening via which the auxiliary air is blown into the inflow passage of the compressor 3.

The auxiliary-air store 10 is connected to the intake tract 4 downstream of the compressor 3 and of the charge-air cooler 8 via a further connecting line 14, in which an adjustable valve 15 is arranged. The auxiliary-air store 10 is supplied with compressed air from a compressor device 17 via a further connecting line 16. The compressor device 17 is advantageously driven by the internal combustion engine 1 and compresses atmospheric air which is sucked in.

The adjustable units assigned to the internal combustion engine 1 are adjusted by means of a control unit 18 as a function of state and operating variables of the internal combustion engine. This statement relates in particular to the valves 12 and 15 of the auxiliary-air feed device 9 and a further valve 19 in a bypass line 20 which branches off from the outflow region of the compressor 3 and returns compressed air into the inflow passage of the compressor.

Figure 2:
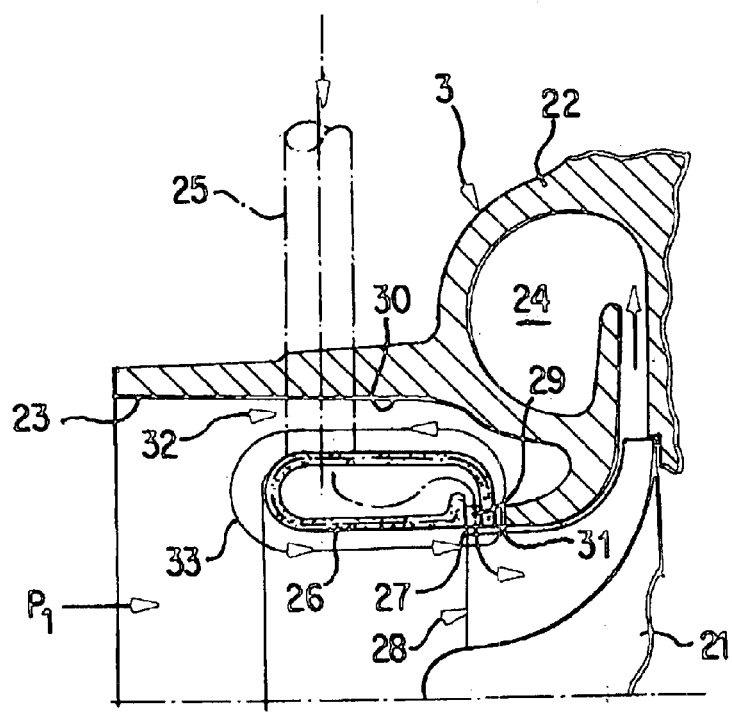
FIG. 2 shows a section through the compressor of the exhaust-gas turbocharger in a first embodiment.

The compressor 3 illustrated in FIG. 2 has a compressor impeller 21 in a compressor housing 22, the compressor impeller 21 being supplied with combustion air, which is at the ambient pressure $p_1$, via an inflow passage 23 in the compressor housing, which is oriented coaxially with respect to the compressor impeller. The combustion air supplied is compressed as the compressor impeller 21 rotates and is introduced radially, via an outflow passage 24 in the compressor housing 22, in the direction of the cylinder inlets of the internal combustion engine.

The compressor 3 is connected to an auxiliary-air feed device which comprises an auxiliary-air passage 25, via which auxiliary air can be blown into the flow-facing region of the compressor impeller 21 when required. The auxiliary-air passage 25 is connected to the auxiliary-air store 10 illustrated in FIG. 1 and/or the connecting line 11 which branches off from the auxiliary-air store 10. The auxiliary-air passage 25 is integrated in the compressor housing 22 and runs radially to the inflow passage 23, via which the main mass flow of the combustion air can be supplied. The auxiliary-air passage 25 opens out into an annular space 26 which is arranged in the radially outer region of the inflow passage 23, is closed off in a pressure-tight manner with respect to the latter and surrounds a radially inner section of the inflow passage, via which the main mass flow of the combustion air can be fed to the compressor impeller. The annular space 26 extends axially beyond the flow-facing side of the compressor impeller 21 and radially surrounds the latter. In the embodiment shown in FIG. 2, the annular space 26 has a cross section which remains constant in the axial direction. The annular space 26 is connected to the inflow passage 23 via an injection opening 27 on the radially inner side of the annular space. The injection opening 27 is located in the flow-facing region of the compressor impeller 21, adjacent to the flow-facing end side of the compressor impeller but slightly axially downstream of the flow-facing end side. The injection opening 27 lies directly radially adjacent to the circumference of the compressor impeller 21.

In the injection opening 27 there is a swirl grating 29 which imparts a swirl to the auxiliary air flowing through the injection opening towards the turbine wheel 21, in particular a swirl in the same direction as the direction of rotation of the turbine wheel 21. The swirl grating 29 may be designed either as a fixed grating or as an adjustable guide grating, for example with adjustable guide vanes, which can adopt different positions in order to change the swirl in the auxiliary air flowing in.

The compressor 3 is provided with a recirculation device, by means of which, in working ranges of the compressor which are close to the surge limit, a recirculation flow, which is directed oppositely to the main flow, of a partial air mass flow can be returned from the flow-facing region of the compressor impeller into an upstream region in the inflow passage 23. The recirculation device comprises a bypass 30 which runs parallel to the inflow passage 23 and in particular radially surrounds the latter, but if appropriate may also form a separate section of the inflow passage 23. The bypass 30 is connected to the inflow passage 23 in the flow-facing region 28 with respect to the compressor impeller 21 via a recirculation opening 31 arranged downstream of the injection opening 27. Upstream of the flow-facing region 28, the bypass 30 is in communication via a recirculation opening 32 with a section of the inflow passage 23 which lies further upstream. The return flow which is indicated by reference numeral 33 can form in the bypass 30 via the openings 31 and 32.

Figure 3:
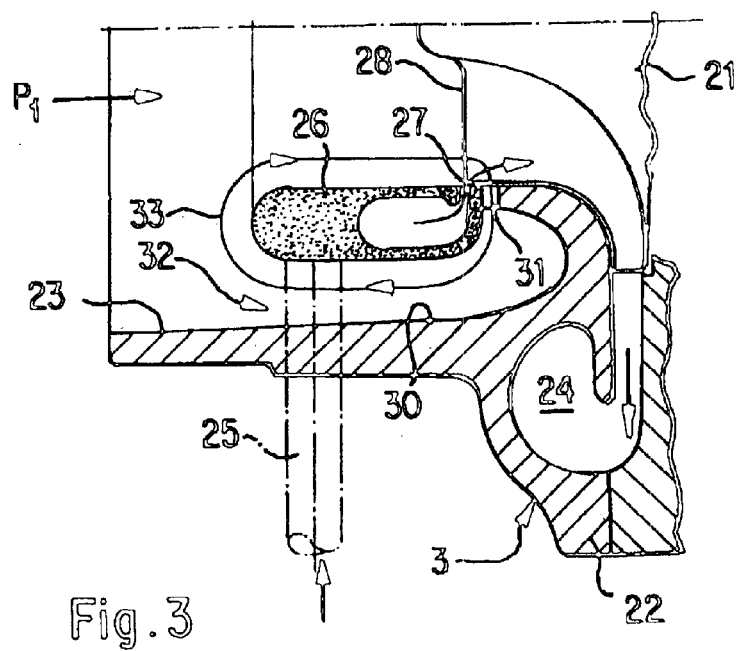
FIG. 3 shows a section through the compressor of the exhaust-gas turbocharger in a second embodiment.

In the exemplary embodiment shown in FIG. 3, the annular space 26 has a cross section which narrows over the circumference in the direction of the injection opening 27. An annular nozzle may be inserted into the injection opening 27, or the injection opening 27 itself may be designed as an annular nozzle.

Figure 4:
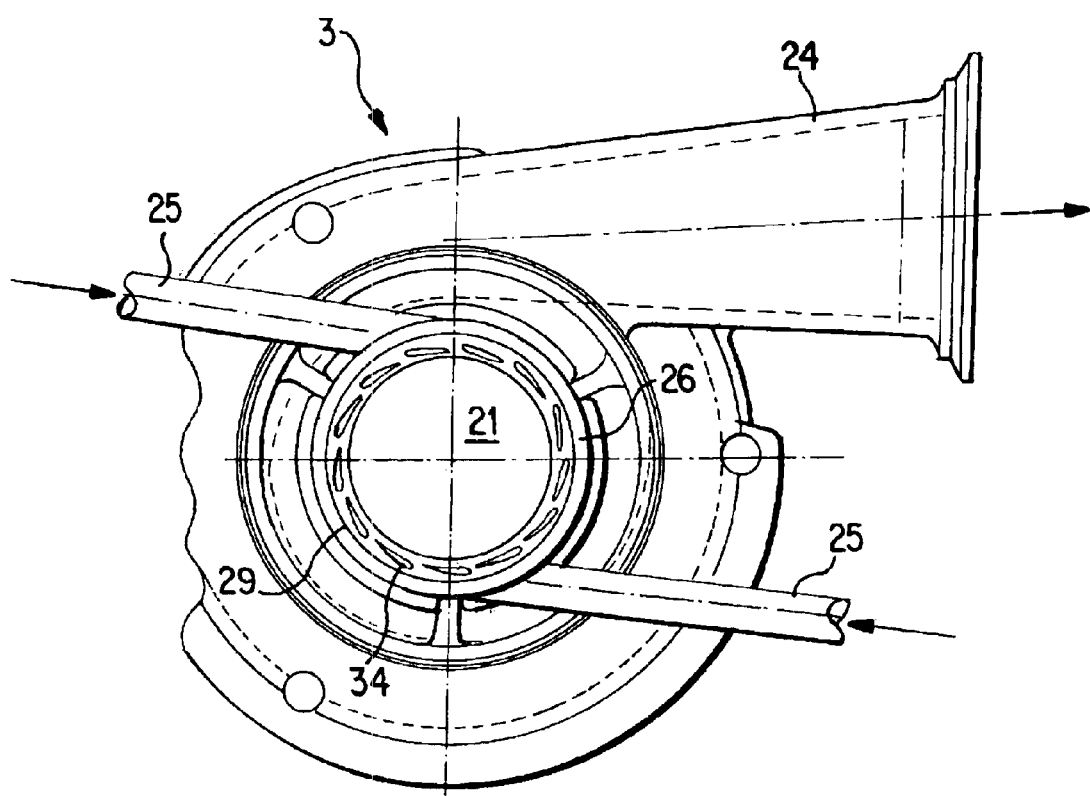
FIG. 4 is a side view of the compressor shown in FIG. 2.

It can be seen from the side view of the compressor 3 illustrated in FIG. 4 that two auxiliary-air passages 25 are arranged in the compressor, which auxiliary-air passages lie diametrically opposite one another and open out tangentially into the annular space 26, via which auxiliary air, which is introduced via the injection openings, is guided firstly onto the swirl grating 29 and then onto the compressor impeller 21. The swirl grating 29 is designed as a guide grating with guide vanes 34 which generate a swirl in the incoming auxiliary air in the same direction as the direction of rotation of the compressor impeller 21. If appropriate, the guide vanes 34 may be designed to be adjustable.

Figure 5:
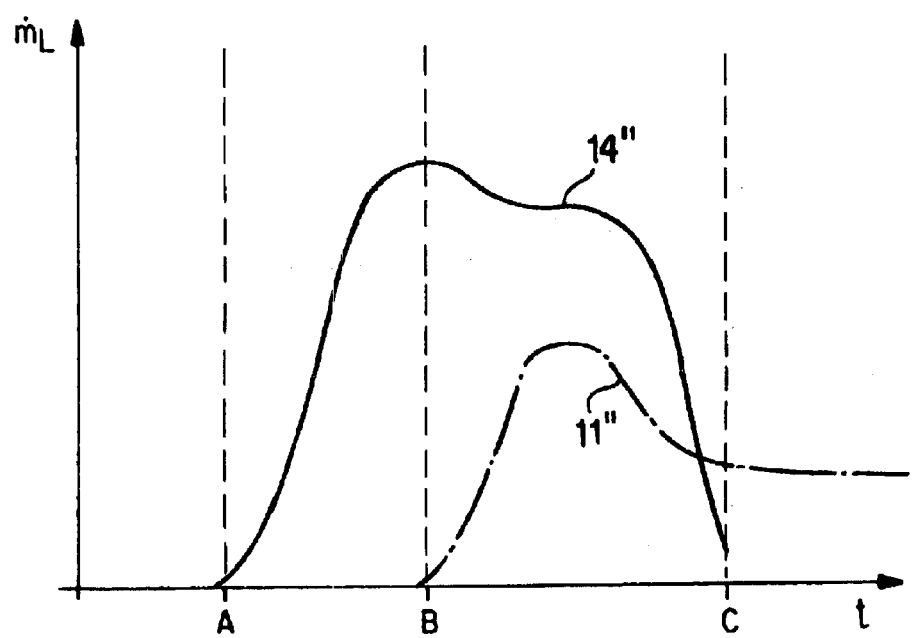
FIG. 5 shows a diagram illustrating the time-dependent curve of the air mass flow which is additionally fed into the intake tract downstream of the compressor and into the inflow passage of the compressor.

The method of feeding the auxiliary air into the compressor flow-facing region can be described on the basis of the diagram shown in FIG. 5, in which the air mass flow $\dot{m}_L$ out of the auxiliary-air feed device via the connecting lines 11 (illustrated in FIG. 1)—into the flow-facing region of the compressor—and 14—downstream of the compressor directly into the intake tract—are illustrated as a function of time. In FIG. 1, the air mass flow through the connecting line 11 is illustrated by a dot-dashed line, and the air mass flow through the connecting line 14 is illustrated by a solid line.

Up to a first time A, the internal combustion engine is in a part-load mode, in which only a slight exhaust-gas backpressure is generated, and accordingly only a relatively low charger output, at which there is as yet no danger to the compressor pumping, is also generated. Therefore, up to time A the valves for feeding the auxiliary air into the compressor flow-facing region and directly into the intake tract downstream of the compressor remain closed for the time being.

Between times A and B, the internal combustion engine is in a first acceleration phase, starting from the part-load mode. First of all, at time A, the valve for blowing the auxiliary air directly into the intake tract is opened, with the result that an elevated charging pressure is generated as a function of the compressor activity. The air mass flow "14" rises accordingly. In this operating range, the valve for controlling the blowing of the auxiliary air into the compressor flow-facing region still remains closed for the time being.

At time B, the valve for feeding auxiliary air into the compressor is opened, and the air mass flow "11" increases. The fact that a threshold value which characterizes the operating state of the internal combustion engine or the exhaust-gas turbocharger, for example a threshold value for the charger rotational speed, is reached, can be used as a criterion for blowing the auxiliary air into the compressor.

Between times B and C, the internal combustion engine is still in an acceleration phase, in which, in accordance with the dot-dashed line "11", the auxiliary air is blown directly into the compressor impeller flow-facing region. This blowing-in of auxiliary air is on the one hand responsible for an additional swirl in the compressor impeller and on the other hand for a shift in the surge limit, with the result that a wider working range of the compressor can be used. At the same time as the auxiliary air is blown into the compressor, the charge air "14" which is blown into the intake tract immediately downstream of the compressor can be reduced.

From time C, the internal combustion engine reaches a virtually steady operating point. The valve for feeding the auxiliary air directly into the intake tract downstream of the compressor is then closed, cf. characteristic curve "14". The extent to which the auxiliary air is blown onto the compressor impeller is restricted and kept at a constant value, cf. characteristic curve "11".

Figure 6:
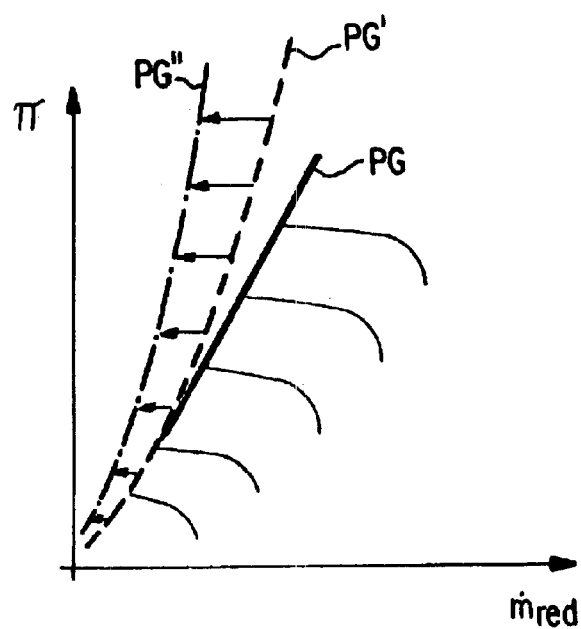
FIG. 6 shows a diagram illustrating the compressor pressure ratio as a function of the reduced mass throughput, based on standard conditions, through the compressor.

The effect of both the recirculation device in the compressor and of the auxiliary-air injection to the compressor impeller on the surge limit is illustrated in the compressor characteristic diagram illustrated in FIG. 6. The total pressure ratio, which characterizes the ratio of the compressor output pressure to the compressor input pressure, is illustrated in the compressor characteristic diagram as a function of the reduced reference mass flow $\dot{m}_{red}$ of the combustion air through the compressor, the reference mass flow $\dot{m}_{red}$ being based on a reference pressure and a reference temperature under standard conditions. The continuous line illustrates the basic surge limit PG, which is shifted with the aid of the recirculation device, via which a partial mass flow of the combustion air supplied can be returned in the opposite direction to the main direction of flow in the inflow passage of the compressor, towards a larger working range of the compressor, in the direction of the ordinate of the diagram, adopting the curve PG' indicated by a dashed line, which has a steeper upwards gradient than the surge limit PG without a recirculation device. The steeper increase in the surge limit PG' makes it possible to generate higher charging pressures in the full-load range of the internal combustion engine.

By blowing air directly onto the compressor impeller, it is possible to shift the surge limit further, as far as the curve PG" which is illustrated by a dot-dashed line. The surge limit PG" is even steeper than the basic surge limit PG or the surge limit PG' which can be achieved by using the recirculation device. In this way, it is possible to establish a considerably wider working range for the compressor in particular by combining the recirculation device and blowing air onto the compressor impeller.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An exhaust-gas turbocharger for an internal combustion engine, comprising:
   an exhaust-gas turbine in an exhaust section,
   a compressor in an intake tract, the compressor comprising a compressor impeller in an inflow passage in a compressor housing, and
   an auxiliary-air feed device for feeding in auxiliary air which is assigned to a compressor region,
   wherein the auxiliary-air feed device comprises an auxiliary-air passage in the compressor housing for supplying auxiliary air which can be introduced, via an injection opening in a wall of the inflow passage of the compressor, into a flow-facing region of the compressor impeller, and
   wherein a recirculation opening is arranged in the wall of the inflow passage to the compressor impeller downstream of the injection opening and is connected to a bypass to the inflow passage.

2. The exhaust-gas turbocharger according to claim 1, wherein an annular nozzle is arranged in the injection opening.

3. The exhaust-gas turbocharger according to claim 1, wherein the injection opening is designed as an encircling annular opening.

4. The exhaust-gas turbocharger according to claim 1, wherein the injection opening comprises a plurality of individual openings distributed over the periphery of the inflow passage.

5. The exhaust-gas turbocharger according to claim 1, wherein the auxiliary-air feed device comprises an auxiliary-air store which is connected to the auxiliary-air passage.

6. The exhaust-gas turbocharger according to claim 1, wherein the auxiliary-air passage is connected to the flow-facing region via a connecting line in which an adjustable valve is arranged.

7. The exhaust-gas turbocharger according to claim 1, wherein an annular space is in communication with the auxiliary-air passage and is connected to the inflow passage via the injection opening.

8. The exhaust-gas turbocharger according to claim 7, wherein the auxiliary-air passage opens out tangentially into the annular space.

9. The exhaust-gas turbocharger according to claim 1, wherein a swirl grating, which imparts a swirl to the auxiliary air which comes into contact with the compressor impeller, is arranged in the injection opening.

10. The exhaust-gas turbocharger according to claim 9, wherein the swirl grating is designed as a displaceable guide grating.

11. A method for operating an internal combustion engine having an exhaust-gas turbocharger according to claim 1, comprising feeding auxiliary air into the flow-facing region of the compressor impeller in the inflow passage during acceleration phases of the engine.

12. The method according to claim 11, wherein the air is fed into the flow-facing region of the compressor impeller when the charger rotational speed reaches a threshold value.

13. The method according to claim 11, wherein a feed of air into the flow-facing region of the compressor impeller is set to a value which maintains a predetermined charging-pressure set value in the intake tract.

14. The method according to claim 11, wherein air from the intake tract is fed into the flow-facing region of the compressor impeller in the inflow passage downstream of the compressor.

15. An exhaust-gas turbocharger for an internal combustion engine, comprising:
an exhaust-gas turbine in an exhaust section,
a compressor in an intake tract, the compressor comprising a compressor impeller in an inflow passage in a compressor housing, and
an auxiliary-air feed device for feeding in auxiliary air which is assigned to a compressor region.
wherein the auxiliary-air feed device comprises an auxiliary-air passage in the compressor housing for supplying auxiliary air which can be introduced, via an injection opening in a wall of the inflow passage of the compressor, into a flow-facing region of the compressor impeller, and
wherein a recirculation opening is arranged in the wall of the inflow passage to the compressor impeller downstream of the injection opening and is connected to a bypass to the inflow passage, which has a return opening leading into the inflow passage upstream of a compressor-impeller entry edge and upstream of the injection opening.

16. An internal combustion engine comprising an exhaust-gas turbocharger for an internal combustion engine, comprising:
an exhaust-gas turbine in an exhaust section,
a compressor in an intake tract, the compressor comprising a compressor impeller in an inflow passage in a compressor housing, and
an auxiliary-air feed device for feeding in auxiliary air which is assigned to a compressor region,
wherein the auxiliary-air feed device comprises an auxiliary-air passage in the compressor housing for supplying auxiliary air which can be introduced, via an injection opening in a wall of the inflow passage of the compressor, into a flow-facing region of the compressor impeller.
wherein the auxiliary-air feed device comprises an auxiliary-air store which is connected to the auxiliary-air passage, and
wherein the auxiliary-air store is connected via a connecting line to the intake tract downstream of the compressor, and an adjustable valve arranged in the connecting line.

17. A method for operating an internal combustion engine having an exhaust-gas turbocharger for an internal combustion engine, having an exhaust-gas turbine in an exhaust section, a compressor in an intake tract, the compressor comprising a compressor impeller in an inflow passage in a compressor housing, and an auxiliary-air feed device for feeding in auxiliary air which is assigned to a compressor region, the auxiliary-air feed device comprising an auxiliary-air passage in the compressor housing for supplying auxiliary air which can be introduced, via an injection opening in a wall of the inflow passage of the compressor, into a flow-facing region of the compressor impeller, the method comprising feeding auxiliary air into the flow-facing region of the compressor impeller in the inflow passage during acceleration phases of the engine, wherein, in a first acceleration phase, before the auxiliary air is fed into the flow-facing region of the compressor impeller, auxiliary air is first blown into the intake tract downstream of the compressor.

18. The method according to claim 17, wherein a feed of air into the intake tract downstream of the compressor is interrupted when a charging pressure in the intake tract reaches a charging-pressure set value.

19. A method for operating an internal combustion engine having an exhaust-gas turbocharger for an internal combustion engine, having an exhaust-gas turbine in an exhaust section, a compressor in an intake tract, the compressor comprising a compressor impeller in an inflow passage in a compressor housing, and an auxiliary-air feed device for feeding in auxiliary air which is assigned to a compressor region, the auxiliary-air feed device comprising an auxiliary-air passage in the compressor housing for supplying auxiliary air which can be introduced, via an injection opening in a wall of the inflow passage of the compressor, into a flow-facing region of the compressor impeller, the method comprising feeding auxiliary air into the flow-facing region of the compressor impeller in the inflow passage during acceleration phases of the engine, wherein the air is fed into the flow-facing region of the compressor impeller when the charger rotational speed reaches a threshold value, and wherein, in a first acceleration phase, before the auxiliary air is fed into the flow-facing region of the compressor impeller, auxiliary air is first blown into the intake tract downstream of the compressor.

20. A method for operating an internal combustion engine having an exhaust-gas turbocharger for an internal combustion engine, having an exhaust-gas turbine in an exhaust section, a compressor in an intake tract, the compressor comprising a compressor impeller in an inflow passage in a compressor housing, and an auxiliary-air feed device for feeding in auxiliary air which is assigned to a compressor region, the auxiliary-air feed device comprising an auxiliary-air passage in the compressor housing for supplying auxiliary air which can be introduced, via an injection opening in a wall of the inflow passage of the compressor, into a flow-facing region of the compressor impeller, the method comprising feeding auxiliary air into the flow-facing region of the compressor impeller in the inflow passage during acceleration phases of the engine, wherein a feed of air into the flow-facing region of the compressor impeller is set to a value which maintains a predetermined charging-pressure set value in the intake tract, and wherein, in a first acceleration phase, before the auxiliary air is fed into the flow-facing region of the compressor impeller, auxiliary air is first blown into the intake tract downstream of the compressor.

* * * * *